Aug. 27, 1957 A. HECHT 2,804,027
SEMI-PERMANENT PULLMAN COVERS FOR BAKING OVENS
AND AUTOMATIC LIFTING MEANS THEREFOR
Filed June 16, 1953 6 Sheets-Sheet 1

Fig. 1.

INVENTOR
Armand Hecht

BY Mason, Fenwick & Lawrence
ATTORNEYS

Aug. 27, 1957 — A. HECHT — 2,804,027
SEMI-PERMANENT PULLMAN COVERS FOR BAKING OVENS
AND AUTOMATIC LIFTING MEANS THEREFOR
Filed June 16, 1953 — 6 Sheets-Sheet 3

INVENTOR
Armand Hecht
BY Mason, Fenwick & Lawrence
ATTORNEYS

Aug. 27, 1957         A. HECHT         2,804,027
SEMI-PERMANENT PULLMAN COVERS FOR BAKING OVENS
AND AUTOMATIC LIFTING MEANS THEREFOR
Filed June 16, 1953         6 Sheets-Sheet 6

INVENTOR
*Armand Hecht*
BY
*Mason, Fenwick & Lawrence*
ATTORNEYS

United States Patent Office 2,804,027
Patented Aug. 27, 1957

2,804,027

SEMI-PERMANENT PULLMAN COVERS FOR BAKING OVENS AND AUTOMATIC LIFTING MEANS THEREFOR

Armand Hecht, Bristol, Va.

Application June 16, 1953, Serial No. 361,936

14 Claims. (Cl. 107—57)

This invention relates to semi-permanent Pullman covers for baking ovens, used in baking Pullman bread. A Pullman loaf is one which is rectangular in cross-section, the pan in which it is baked being overlain by a planiform cover which restrains the loaf from rising above the pan and conforms the upper crust to the planiform shape of the cover.

A semi-permanent cover is one that is detachably engaged with the oven tray that carries the pans of loaves through the oven, so that the cover remains with the tray and does not have to be handled through successive baking of Pullman loaves, but which may be readily removed without use of tools when a run of loaves other than the Pullman type is to be baked.

One of the objects of the invention is to provide a Pullman cover so detachably engaged with the tray as to normally remain unitary with the tray throughout the baking cycle, including the pan discharging phase of said cycle.

Another object of the invention is to provide a semi-permanent Pullman cover as described, the tray engaging means being constructed to provide a range of freedom of relative movement between the cover and the underlying tray, so that the cover can accommodate itself to pans of different height and also to warped pans.

Still another object of the invention is the provision of a semi-permanent Pullman cover as described, in combination with means on the oven whereby at the dumping station, the cover is restrained from following the tilting movement of the tray, resulting in the lifting of the cover from the pan, permitting the latter to freely slide from the tray upon the unloading conveyor which ordinarily confronts the tray at the dumping station, without hindrance from the cover.

A further object of the invention is the provision of a Pullman cover as described, in combination with latch means and oven structure controlling said latch means, for holding the forward part of the cover above the level of the top of the pan after the tray has resumed its level position subsequent to dumping, and until it has moved beyond the loading station, permitting the free insertion of a pan of unbaked loaves upon the tray beneath the raised cover.

Another object of the invention is to provide a Pullman cover as described, in which the planiform face of the cover is formed with an allover uniform pattern of small perforations overlying both the loaf compartments of the pan and the flue spaces between the loaf compartments.

Other objects of the invention will appear as the following description of practical embodiments thereof proceeds.

In the drawings which accompany and form a part of the following specification, and throughout the several figures of which the same reference characters have been employed to denote identical parts.

Before referring in detail to the drawings, it is to be understood that the ovens and oven trays used for purpose of illustration are of known type and no claim is made to their structure and mode of operation except as to minor additions to the oven structure essential to the operation of the means for lifting the Pullman cover at the unloading station, and for maintaining it lifted until the oven trays have passed the loading station.

Figure 1:
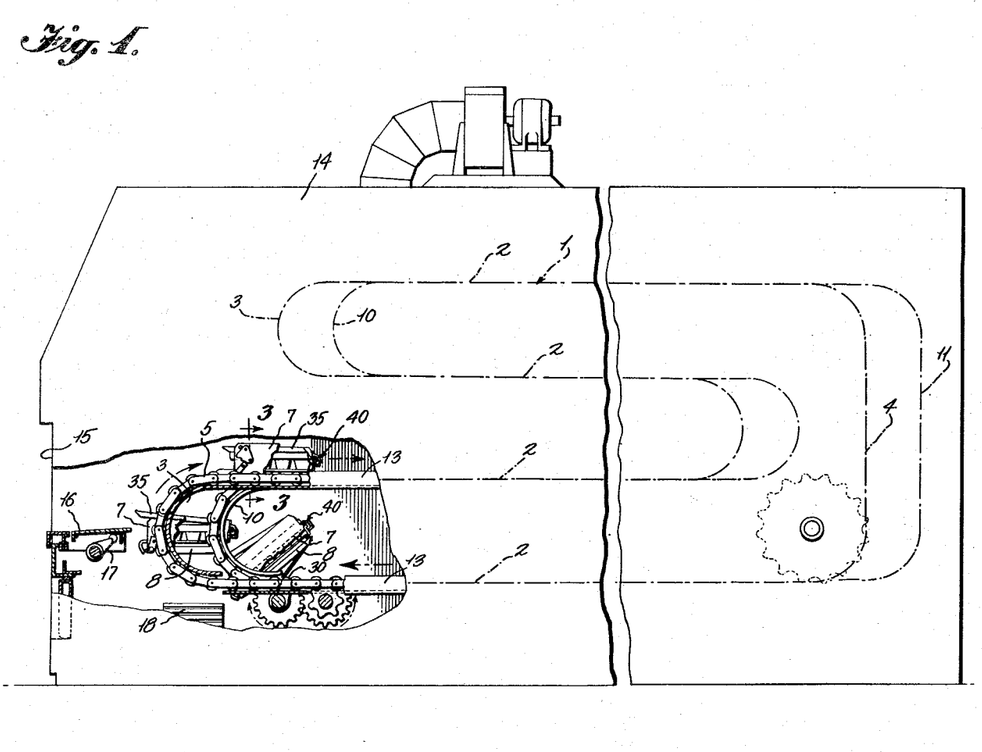
Figure 1 is a side view, largely diagrammatic, showing a known type of baking oven, illustrating the trays in dumping and loading positions and in normal baking position, the trays being shown equipped with the semi-permanent covers of the present invention.

Referring now to that form of the invention shown in Figures 1 to 8, inclusive, the oven structure is of the type described in the patent to Rundquist, 2,541,386, granted February 13, 1951, in which the continuous tray conveyor 1, indicated in broken lines in Figure 1, is of the serpentine type, operating in a vertical plane, having horizontal flights 2 between return bends 3 and 4. The conveyor comprises essentially a pair of spaced chains 5, arranged in side by side congruency, bridged at intervals by shafts 6 on which the trays 7 are tiltably mounted. Each shaft has a pair of horizontal tray supports 8, welded thereto at the rear, and since it is essential that the trays be kept perfectly level at all times while traveling the horizontal flights as well as the return bends of the conveyor, except when positively dumped at the unloading station, an additional conveyor chain 9 is provided at one side, the straight flights of which are in the horizontal planes of the corresponding straight flights 2 of the chains 5, but the return bends 10 and 11 of which are offset an equal distance from the corresponding return bends 3 and 4 in a direction rearwardly thereof. Each of the shafts 6 has a rearwardly extending arm 12 on the side adjacent the chain 9, equal in length to the offset distance of the return bends, and parallel to the tray supports 8, having its rear end pivotally connected to the chain 9 (see Figure 4). Thus, the arm 12 is horizontal at all times, inhibits rotation of the shaft 6, and maintains the tray supports horizontal.

Figure 4:
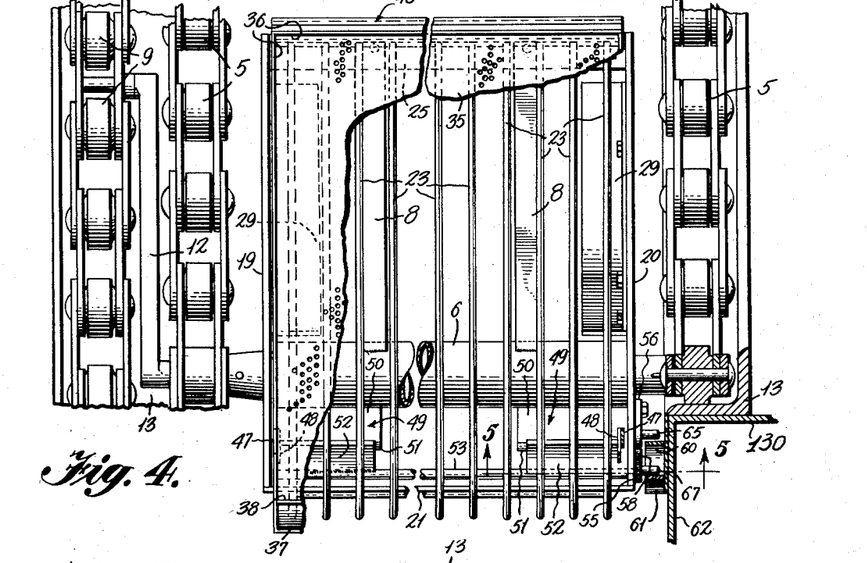
Figure 4 is a fragmentary plan view of an oven tray with a Pullman cover and the tray conveyor, viewed in the direction indicated by the line 4—4 of Figure 3, parts being in section and part of the cover being broken away to disclose underlying structure.

The conveyor chains are supported by rigid track means 13 supported by shoulders on the side wall 62, one of which shoulders is shown at 130 in Figure 4.

The oven includes a casing 14, having a loading doorway 15 at the front and a loading platform 16 within said doorway, which is in front of the lowermost return bend 3 of the tray supporting conveyor 1, and which rises and descends through the operation of a crank 17 operatively connected thereto. The conveyor and crank are driven by mechanism, not shown, which may be of the type shown in the above mentioned Patent Number 2,541,386 so synchronized that the platform rises concurrently with a tray at the adjacent return bend and at a slightly higher level than the tray, giving some time latitude in shoving a pan of unbaked loaves from said platform onto said tray.

The casing 14 is provided with an unloading door, not shown, approached by a transverse conveyor 18 bearing pans of baked loaves gravitationally discharged upon it from a tray mechanically tilted at an unloading station just anterior to the lowermost return bend 3. The conveyor 1 travels in the direction indicated by the arrows in Figure 1.

The tray 7 is of known construction. It consists of two spaced parallel similar deep side walls 19 and 20 connected across the lower part of the front of the tray by a front wall 21 of narrow depth. A grid 22 consisting of longitudinal spaced rods 23 is welded to the front wall 21 and extends rearwardly at the level of the top of the front wall. A rear wall 24 bridges the side walls 19 and 20, having a lower forwardly turned flange 25 extending beneath the grid to which the rear end of the grid is secured, a transverse reinforcing rod 26 intervening. The rear wall 24 extends above the grid, having its upper edge terminating at a level below the top edges of the side walls, and formed with an outturned flange 27. This is reinforced by a rod 98 welded along the top and which forms part of the rear wall structure of the tray. The side walls 19 and 20 include portions 28 that extend below the grid and have cam followers 29 secured thereto engaged by the respective driven dumping cams 30.

The depending portions 28 of the side walls of the tray are journaled upon the shaft 6 so that the tray is freely tiltable upon said shaft. When the tray is in its normal baking position, the lower flange 25 of the rear wall rests upon adjusting screws 31 at the ends of the tray supports 8, which screws may be adjusted to make the grid precisely level. This level state of the gird is maintained throughout the circuit of the trays, except while the trays are under the control of the dumping cams 30.

Figure 2:
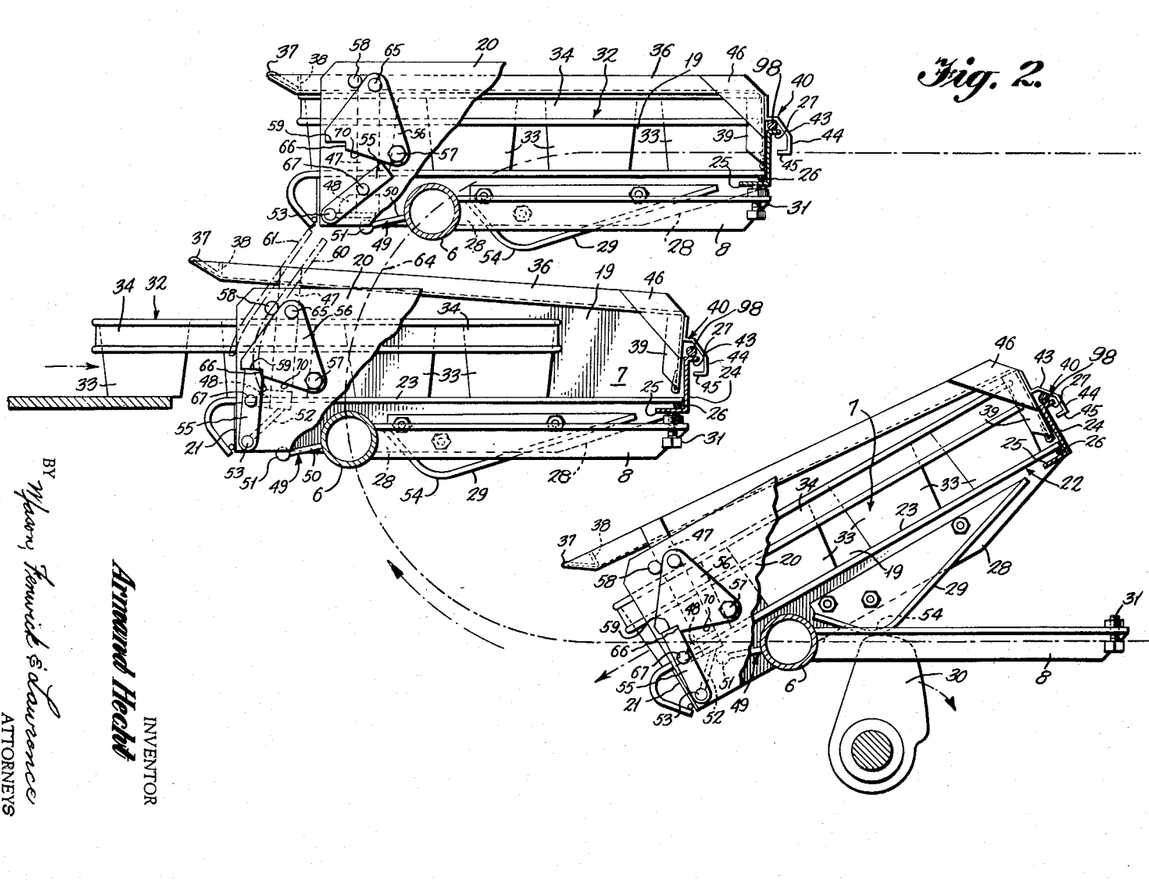
Figure 2 is a side elevation indicating the path of movement of three successive trays on the conveyor, respectively at the unloading and loading stations and beyond the loading station, showing the position of the latching means and the Pullman cover in each of the tray positions.
Figure 3:
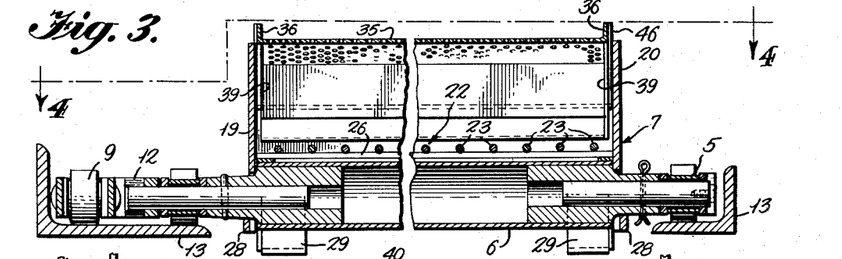
Figure 3 is a vertical cross-section taken along the line 3—3 of Figure 1, showing the Pullman cover slightly raised to reveal its perforated structure.

The pan 32, which is best shown in Figure 2, is of conventional construction, comprising a series of loaf compartments 33 bound together in side by side spaced relation by the peripheral rim 34. The spaces between the loaf compartments are flues to effect uniform baking of the adjacent sides of the loaves. The pans may be of different dimensions, so that two or more may fit widthwise into a tray, but to simplify the disclosure of the invention a single pan is shown substantially fitting the tray, with a single Pullman cover. As will be noted, the side walls of the tray extend above the pan so that the Pullman cover lies between the sides of the tray.

The Pullman cover, as shown, comprises a planiform sheet member 35 designed to rest upon the top edges of the pan, having peripheral turned-up stiffening side flanges 36, the front edge 37 of the sheet member being upwardly inclined and being overfolded to double its thickness for purpose of reinforcement. A stiffening flange 38 is secured transversely across the sheet perpendicular thereto between the side flanges, adjacent the front edge of the cover. The rear portion of the sheet is turned down to form a deep flange 39, substantially perpendicular to the pan-overlying portion of the cover, the lower end of said flange being strengthened by being overfolded. The flange 39 lies between the pan and the rear wall 24 of the tray when a pan is in the tray. Means is provided on the back of the flange 39 for detachably hooking the cover to the tray. This means comprises an inverted trough member 40, secured to said flange, which may be continuous for substantially the full width of the cover, as shown in Figure 4, or in the form of spaced hooks 41 and 42, as suggested in that form of cover illustrated in Figure 12. The cross-sectional shape of the trough member is important to the specific construction of the cover. Said member has the inclined portion 43 contacting the rear wall structure of the tray, camming thereupon under the weight of the cover to draw the latter back as far as possible toward the rear of the tray. It has the downwardly extending portion 44 with in-turned flange 45 at its lower end, said portion 44 being of such depth as to place the flange 45 normally some distance beneath the flange 27 of the tray. This enables the cover to adjust itself so as to fit down upon pans which may vary somewhat as to height, and still leave said flanges 45 and 27 in interengaging position when the tray is tilted for unloading. The open mouth of the trough member 40 is amply wide to permit the cover, when no pan intervenes, to be lifted free of the tray structure and removed. The pan-overlying portion of the cover and the back flange 39 are rigidly braced by the corner braces 46. In the interest of economy of manufacture and uniformity of temperature distribution resulting in a more evenly baked product, that portion of the sheet 35 which overlies the pan is formed with a uniform pattern of small perforations over both the loaf compartments and the flue spaces between them.

It is essential that the cover be automatically lifted at the unloading station relative to the pan, to relieve the pan of its weight, and to break any crust adhesions between the cover and the tops of the loaves, so that the pan will freely gravitationally slide from the tilted tray onto the unloading conveyor 18. To accomplish this purpose the cover is provided on each side adjacent the forward end with legs 47 having foot extensions 48 extending in the longitudinal direction of the cover. These legs with the foot extensions project through the grid and cooperate with cam means 49 which have been added to the conventional oven structure. Said cam means in the example shown, comprise a pair of forwardly directed plates 50 welded to the shaft 6, having round contact ends 51. Since the shaft 6 never rotates, the cam means 49 are fixed at all times relative to a horizontal datum. When the tray, together with the cover, is tilted about the shaft 6 by the dumping cams 30, lowering of the forward end of the tray is inhibited, since the legs 47 are of such length as to be stopped by the contact ends 51, so that as the tray continues to tilt, the cover is relatively raised from the top of the pan, as shown in the lowermost tray position in Figure 2. As the cover swings away from the pan, the back flange 39 of the cover gives the rear of the pan an initial push, starting it down the inclined grid.

As in the dumping movement of the tray it tilts about the axis of the shaft 6, while the cover tilts about an axis within the confines of the trough member 40, there will be relative sliding movement between the lower ends of the legs and the contact ends 51, the purpose of the elongated foot extensions 48 being to provide for this sliding movement. Incidentally, it is to be noted that the foot extensions do not directly engage the contact ends 51, but engage intervening flaps 52 fixed to a transverse shaft 53 the function of which will be explained, and which flaps at the time are lying against the contact ends 51.

As the apexes 54 of the cam followers 29 pass beyond the noses of the dumping cams, the empty tray reassumes its level position, but the legs of the cover remain stopped by the cam members 49, so that the cover moves relatively downward with respect to the grid of the tray. The length of the legs is such that when the tray has releveled itself beyond the unloading station, the cover with the ends of the legs resting stopped by the cams 49, in the absence of means for maintaining it in an upwardly inclined position, will lie parallel to the grid and spaced therefrom a distance substantially equal to the shallowest pan ordinarily employed. If the tray conveyor is of the intermittently operated type, it is not necessary to provide the means for maintaining the cover raised above the pan space until it reaches the loading station, for the dwell of the pan at the loading station gives time for the operator to push the pan of unbaked loaves in between the lowered cover and the grid, the back edge of the pan camming against the upwardly inclined nose of the cover if the pan is a little higher than the normal pan space, lifting the cover sufficiently to permit the pan to be pushed all the way in.

The means for maintaining the cover in its upwardly inclined position until it reaches the loading station is employed where the tray conveyor is of the continuously driven type and the pan at the loading station must be pushed in while the tray is moving upwardly. This invention, therefore, provides means for lifting the legs upward, and with them the cover, from their repose position shown at the unloading station in Figure 2, and holding them lifted until a pan of unbaked loaves has been inserted between the grid and lifted cover at the loading station, then releasing them to permit the cover to come down squarely upon the upper edges of the pan, this being its position throughout the travel of the tray through the oven until it again reaches the dumping cams.

Said means include the shaft 53 carrying the flaps 52, the latter preferably being of the same width in a transverse direction as the contact ends 51 of the cam member 49. The shaft 53 is journaled in the side walls 19 and 20 of the tray, and therefore, rises with the front of the tray as the latter moves from tilted to level position, the flaps 52 rising with the shaft 53, and since they are in contact with the foot extensions 48, the legs 47 are correspondingly lifted. In order to prevent the weight of the cover which is imposed upon the flaps from rotating the shaft 53 and keeping the flaps down against the contact ends 51, a keeper 55 is provided on one end of the shaft 53, and a latch 56 for holding said keeper in position, so as to prevent rotation of the shaft 53 until the tray has passed the loading station. In the drawings the keeper and the latch are shown on the side of the tray nearer to the observer. The keeper 55, as shown, is an arm fixed to the shaft, and the latch 56 is a generally triangular member pivoted to the side wall 20 of the tray on a pivot 57, the latch being overbalanced so as to swing gravitationally in a counterclockwise direction, there being a projecting pin 58 on the side wall 20 to limit the counterclockwise movement of the latch. In the showing of the tray at the loading station in Figure 2 the latch is in this limit position.

Referring to the lower and intermediate trays in Figure 2, the upper end of the keeper 55 is shown seated in a notch 59 in the latch 56 and held there through the weight of the cover transmitted through the legs 47 against the flaps. This position of parts is maintained while the tray moves from the unloading to the loading station. At the loading station, it will be observed, the cover is in flared relation to the grid so that the pan of unbaked loaves can be freely inserted without contacting the cover until it approaches the back of the tray. At some point before the back of the tray is reached the pan contacts the rear portion of the cover if its height is greater than that of the space between the cover and grid at the rear, in which case it lifts the cover, this being permitted by the lost motion provided between the lugs 27 and 45. After the pan has been inserted, the keeper and latch must be released so as to assume the release positions shown in the uppermost tray position in Figure 2.

Figures 6, 7:
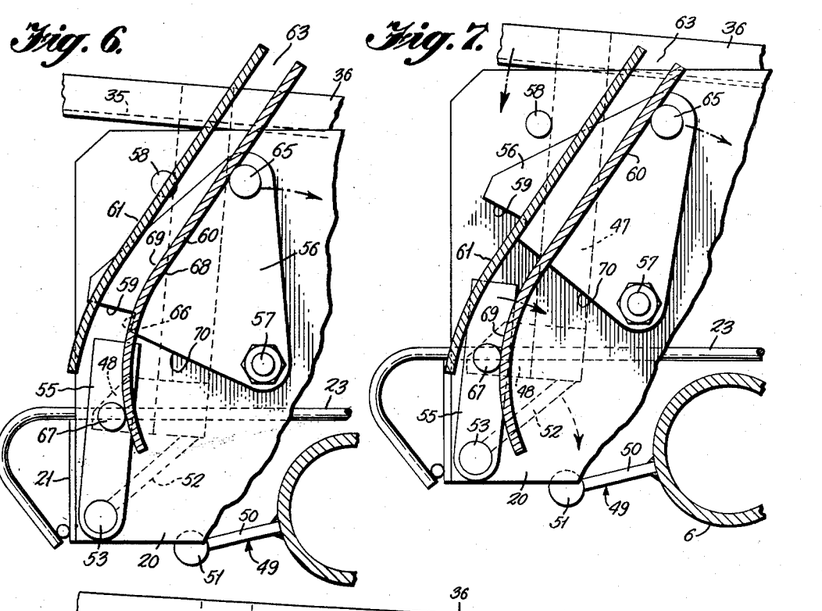
Figures 6, 7 and 8 are vertical views partly in elevation and partly in section, showing the latch means for holding the Pullman cover raised, in sequential positions following the initial raising of the cover at the unloading station.
Figure 8:
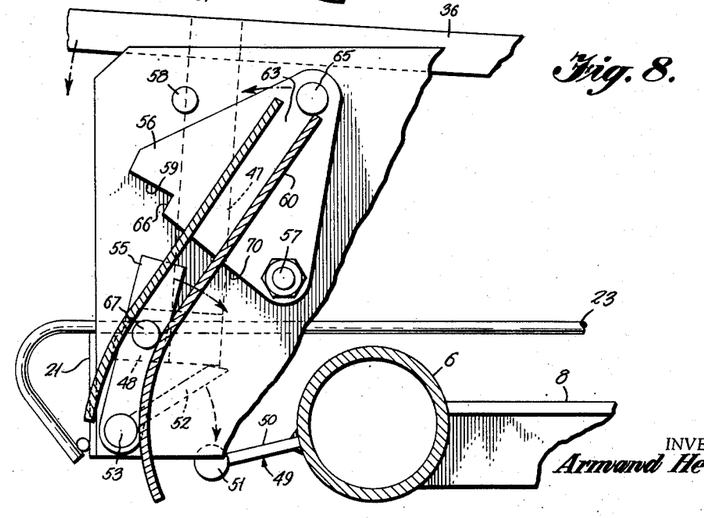

Figures 6 to 8 show a sequence of positions assumed by the keeper and latch between the positions indicated in the middle and uppermost tray positions in Figure 2.

Figure 5:
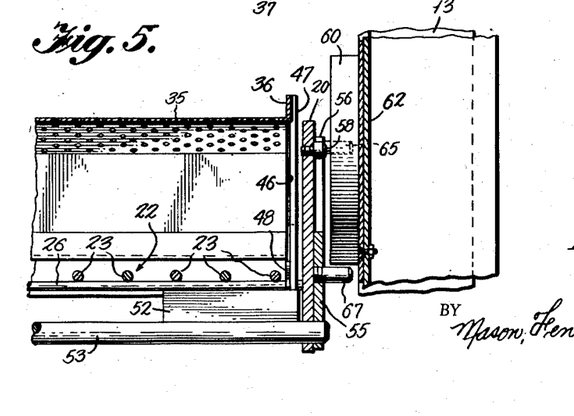
Figure 5 is a cross-section taken along the line 5—5 of Figure 4.

In order to move the latch to release position and permit the lowering of the unit represented by the keeper, the transverse shaft 53 and the flaps 52, a fixed cam 60 has been added to the oven structure. Figures 2, 4 and 5 show that the side wall 62 of the oven comes close to the adjacent sides of the trays at the loading station. It is to this part of the oven wall on the inside that the cam 60 is secured. Said cam, as shown, has the form of a narrow plate with a curved lower end which merges into a straight upper portion. A cam 61 is also provided in spaced relation to the cam 60 and of the same general shape, forming a channel 63 between said shield and cam, with a flaring mouth at its lower end, the straight portions of said shield and cam being parallel and inclined toward the curvilinear orbital path of the axis of the shaft 6, indicated by the numeral 64 in Figure 2. Both faces of the cam 60 are active. A pin 65 projects from the upper apex of the latch which, in the movement of the level tray upward and to the right, clears the concave portion of the under face 68 of the cam 60, but contacts the upper straight part of said face, causing the latch to swing clockwise, away from the stop pin 58, as shown in Figure 6, lifting the shoulder 66 of the notch 59 above the keeper, and releasing the keeper from the latch. The keeper has a projecting pin 67 which engages the outer or convex face 69 of the cam 60, and it must engage said face before the coaction of the pin 65 with the cam face 68 has lifted the latch sufficiently to release the keeper, otherwise, the latch would be free to swing gravitationally under the weight of the pan in a clockwise direction, the pin 67 passing beneath the cam 60. This would result in a sudden lowering of the cover. The lower end of said cam is curved to assure that the pin 67 will be switched to the face 69 as the cam tray moves upward. The pin 67 is pressed against the cam face 69 by the weight of the cover pressing upon the flaps 52, but at some point in the travel of the pin 67 upward upon said cam face, the cover will make flat contact with the pan, taking the weight of the cover off of the flaps 52. However, since the keeper leans to the right of the vertical plane through the axis of the shaft 53, the major part of its weight plus the weight of the flaps 52 balances the keeper in a clockwise direction so that the pin 67 continues to hug said cam face throughout its traverse of the straight portion thereof. Since the straight portion converges toward the orbital curve 64, the keeper progressively inclines further toward the horizontal, lowering the flaps 52 until when said pin leaves the upper end of the cam face 69 the flaps 52 rest upon the contact ends 51 of the cam member 49, as shown in the uppermost tray position in Figure 2. The function of the correlation of the pin with the cam face 69 is to gradually lower the keeper and flaps 52, first to prevent the cover from slamming down upon the pan, as would be the case if the flaps were left free to fall, upon release of the keeper, and then to prevent the flaps from impactively striking the contact ends 51 of the cam 49. As the latch 56 leaves the cam face 68 while the keeper is still under the control of the cam face 69, the latch will swing down in a counterclockwise direction so that the lower face 70 of the latch will land upon the end of the released keeper. Both keeper and latch will move upwardly in contact, the keeper beginning to swing in a clockwise direction beneath the latch as soon as the pin 67 of the keeper reaches the straight portion of the cam face 69.

The latch being relatively light will not impede the swing of the keeper, although it is resting against it. As soon as the end of the keeper has moved beyond the face 70 of the latch, the latter swings gravitationally in a counter-clockwise direction until halted by contact with the stop pin 58.

Although as stated, the overbalanced weight of the unit constituted by the shaft 53, keeper 55 and flaps 52 is, in general, relied upon to maintain the pin 67 riding upon the cam face 69, it is possible that as the tray begins to pass beyond the loading station, moving upward and toward the rear, the pin 67 may tend to strike the inner face of the cam 61 before it contacts the face 69 of the cam 60, the reason being that in this position the flaps 52 are so close to vertical that only a component of their weight contributes to the overbalancing weight of the unit, whereby the friction of the mechanism under the conditions of oven heat may be so great as to nullify the overbalancing weight of the unit. One cannot, therefore, place complete reliance upon the overbalancing weight to cause the pin immediately to drop upon the cam face 69 smoothly and without jar or delay, and the purpose of the cam 60 is to control the movement of the pin 67 and keeper when under such conditions until the unit has become tilted sufficiently to augment its unbalanced weight to the point at which such frictional retardation has been overcome and it tilts to transfer the pin 67 to the cam face 69.

Figures 9, 14:
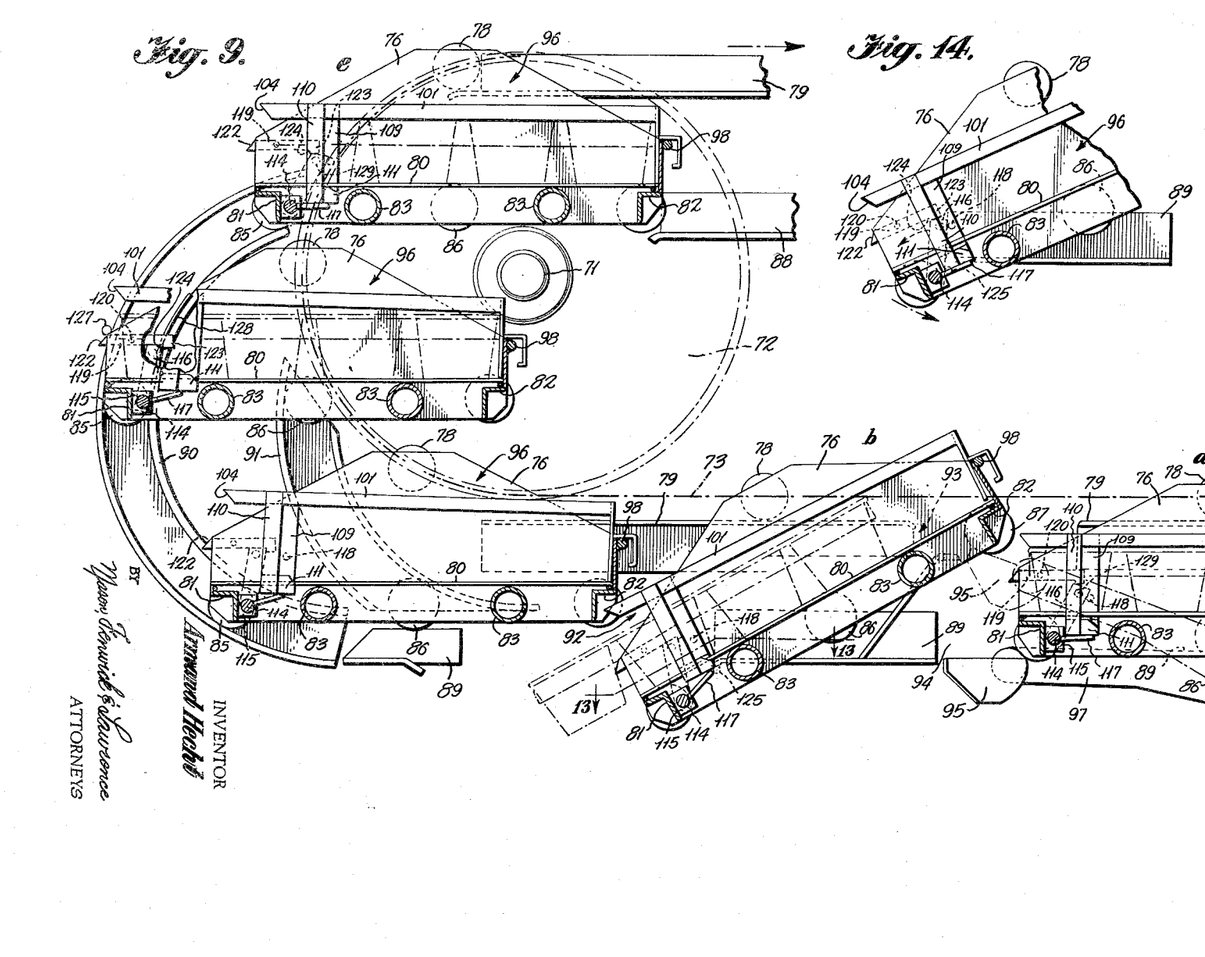
Figure 9 is a side elevation, partly in section, of another type of oven and oven tray, showing trays at the unloading and loading stations and at two positions therebeyond, illustrating the means for raising the cover and maintaining it raised.
Figure 14 is a fragmentary view partly in elevation and partly in section showing the forward portion of the pan and cover in the initial stage of its tilting position showing the fixed pin in operative contact with the actuator arm.

In Figures 9 to 13, inclusive, a modification of the invention is disclosed adapting it to another conventional type of oven, in which the trays are suspended in substantially balanced state at points above their center of gravity. Figure 9 is a longitudinal section disclosing a sufficient portion of the oven mechanism to serve as a background for the present invention, the showing being largely diagrammatic.

At the forward end of the oven is the horizontal drive shaft 71 on which two similar sprockets 72 are mounted in spaced relation, only one being shown. Similar sprockets, not shown, are located at the rear end of the oven, the axes of rotation of both pairs of sprockets being in a horizontal plane. A pair of endless conveyor chains, one of which is indicated at 73, pass about the corresponding front and rear sprockets of said pairs and together constitute a conveyor between which the trays 96 are suspended at regular intervals.

Figure 10:
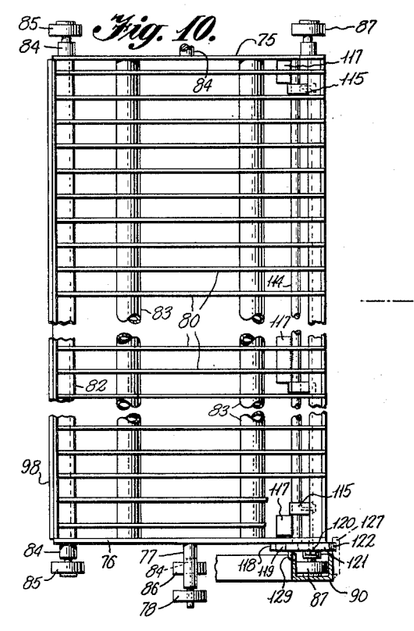
Figure 10 is a plan view of one of the trays with an intermediate portion broken away, the guiding track being shown in section.
Figure 11:
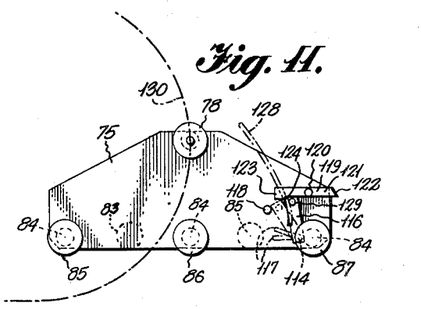
Figure 11 is a side elevation of an oven tray illustrating the cover lifting mechanism.

The tray in this type of oven consists of similar side plates 75 and 76, Figures 9 and 10, having transversely coaxial rod extensions 77 fixed to said side plates and extending outwardly therebeyond, having rollers 78 journaled thereupon, only one extension, with the corresponding roller being shown, in Figure 10. The ends of said rod are pivotally connected to the conveyor chains. The horizontal flights of the conveyor chains overlie horizontal tracks 79 upon which the rollers 78 ride to prevent any sagging of the chains from affecting the horizontal traverse of the trays. The tray has a grid 80 at an intermediate level in the height of the side plates, a transverse angular support connecting the side plates beneath the front of the grid and supporting the latter, and an angular support 82 at the rear shaped to form a seat for the rear of the grid, and extending perpendicularly above the grid to form the rear wall of the tray, said rear wall terminating below the level of the top of a pan and being reinforced above its upper edge by a transverse rod 98 which forms the fulcrum for the Pullman cover, as will appear.

The tray is further strengthened by hollow rods 83 extending between the side plates beneath the grid and secured to said side plates. The side plate 76 which is on the far side of the tray, as observed in Figure 9, has bosses 84 secured thereto on the outside thereof at the front, middle and rear, said bosses having reduced portions on which the respective rollers 85, 86 and 87 are journaled. Said rollers ride on horizontal track means 88 and 89 positioned below the respective upper and lower straight flights of the conveyor chain on the far side, to keep the trays from teetering, and the front and middle rollers 86 and 87 ride within arcuate channel track means 90 and 91 at the forward end of the conveyor on the far side, for maintaining the trays level as they pass upward over the forward sprockets. The lower horizontal track means 89 and the adjacent horizontal track 79 are discontinuous at the respective gaps 92 and 93, to let the terminal rollers 85 to 87 swing through the track paths as the tray is tilted at the unloading station, and the lower track means 89 is also discontinuous at the gap 94, to let the dumping cam 95 cross the track path. Said dumping cam extends inwardly from the end of an arm 97 mounted on an oscillating shaft, not shown, the movement of which is synchronized with the conveyor drive so that in its upward movement the dumping cam contacts the rear roller 87 and elevates the rear end of the tray, which swings upon the axes of the rollers 78.

Figure 12:
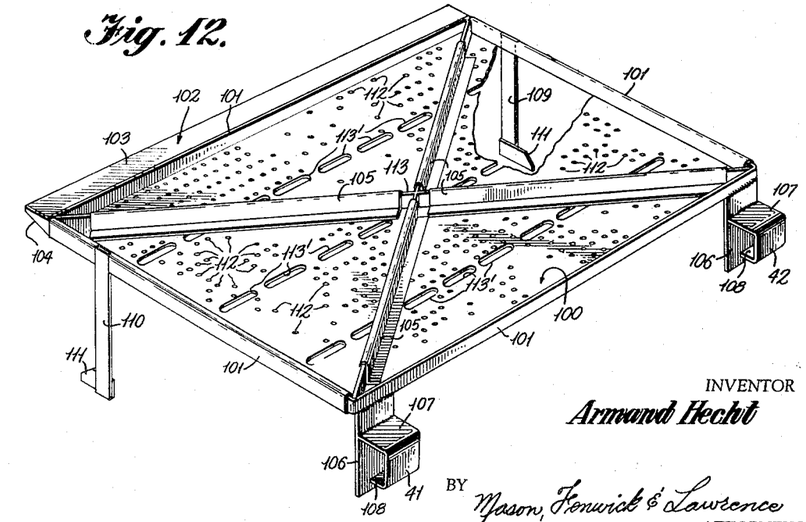
Figure 12 is a perspective view of a somewhat modified form of Pullman cover adaptable to various types of oven tray.

The Pullman cover previously described in connection with the Rundquist oven is equally adapted for use with ovens of the ferris wheel type and ovens of various other types, but since the cover itself is amenable to some modification, opportunity is here afforded to describe a slightly modified form of cover which is illustrated in Figure 12. This comprises a planiform sheet 100 peripherally stiffened by a frame of upstanding flanges 101 secured thereto, and having a folded nosepiece 102 secured at the front, with its upper face 103 parallel to the sheet 100 and its lower face 104 flaring upwardly in a forward direction. The cover is further reinforced by a diagonal spider 113 of strap iron contacting the sheet 100, and secured within the frame at the corners thereof. The limbs of the spider are overlapped by folded metal strips 105, having a flange in surface contact with the sheet 100 and continuously secured thereto.

At the rear, the cover is provided with the depending lugs 106 which take the place of the continuous back flange 39 of the first described cover, and which have the same function as said back flange in giving an initial nudge to the pan when the cover is raised responsive to tilting of the tray, starting the pan on its gravitational slide toward the unloading conveyor. On the back of the lugs 106 are the hooks 107 with inturned terminal flanges 108, which hooks detachably embrace the reinforcing rod 98, as shown in Figure 9, with ample lost motion to permit the rear of the cover to rise responsive to the height of the inserted pan.

Since the trays of baking ovens are generally wide enough to contain two or more pans arranged side by side, it is frequently desirable to provide covers individual to the pans instead of a single cover wide enough to embrace all, as in the first described modification. Frequently, the width of the trays is such as to make it necessary to conserve space in the construction of the cover in order to make a plurality of covers fit into the tray. Assuming that the thickness of the lifting legs is one-fourth of an inch, if the legs of each cover are equidistant from the front as in the first described form, then the legs of adjacent covers will abut side by side, requiring a half inch between adjacent covers, or an entire inch where three covers are used. This may be too much for the width of the tray. By the present invention, the lifting leg 109 on the left hand side of the cover, viewed from the front, is placed farther from the front of the cover than the leg 110 on the right hand side, by an amount equal to the width of the legs, so that when two of the covers are placed together side by side, the leg 109 of one will nest behind the leg 110 of the other, reducing the space between the covers to the thickness of a single leg. The legs terminate in foot extensions 111 which are preferably oppositely directed.

In the cover illustrated in Figure 12 a pattern of small closely distributed perforations 112 is employed in those areas of the sheet 100 that overlie the loaf compartments, while rows of larger elongated perforations 113' are used in those areas that overlie the flue spaces between said compartments.

The means for lifting the cover responsive to the tilting movement of the tray at the unloading station, holding it raised until after it has passed the loading station and returning it gradually to pan closing position beyond the loading station, and returning the holding mechanism to normal repose position, will now be described.

Referring to Figures 9 and 10, a shaft 114 extends transversely the full width of the tray adjacent the front, beneath the grid, journaled in lugs 115 fixed to the rear side of the front transverse member 81. The far end of the shaft projects through the side plate 76, an actuator arm 116 being fixed to the projecting end and extending in a generally upward direction. The shaft carries rearwardly extending flaps 117, one at each end within the confines of the side plates, and one or more at intermediate points in the length of the shaft, said flaps being positioned in registry with the legs of the covers. In Figure 10, for instance, three flaps are shown, the middle one being registrable with the nest of legs of adjacent covers. A stop pin 118 projects from the side plate 76 into the path of oscillation of the actuator arm, determining its repose position after release, as shown in the tray positions a and e of Figure 9, in which the flaps 117 lie substantially horizontal beneath the legs of the cover, generally a slight distance out of contact with the foot extensions, since the cover is resting upon the pan. The predominant weight of the unit constituted by the actuator arm, shaft 114 and flaps 117 overbalances the unit so that when free to move, the actuator arm is swung toward the stop pin. A latch 119 overlies the actuator arm, being pivoted to the tray side plate 76 at the point 120, in overbalanced relation so that it rests gravitationally upon the end of the actuator arm. The forward end 121 of the latch extends beyond the front end of the side plate 76, and has its end face 122 beveled upwardly toward the rear. The opposite end of the latch has a downward extension 123 defining a notch 124 behind it, which retains the actuator arm when the latter has swung sufficiently in a counterclockwise direction to let the extension 123 fall behind it.

Figure 13:
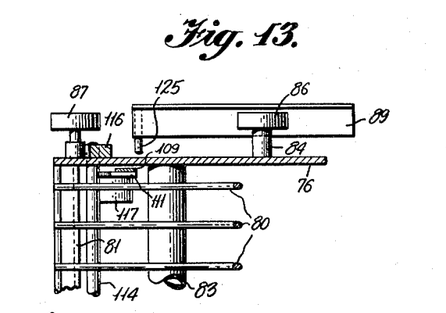
Figure 13 is a horizontal sectional view taken along the line 13—13 of Figure 9.

In order to operate the actuator unit to lift the pan at the unloading station and to latch the actuator arm in position to hold the pan elevated until past the loading station, it is necessary to add the following elements or their equivalent to the fixed oven structure: A pin 125, fixed at the forward end of the discontinuous portion 126 of the track means 89 adjacent the gap through which the forward end of the tray tilts at the unloading station, said pin projecting inwardly, as shown in Figure 13, a sufficient distance to engage the rear side of the actuator arm as the tray tilts, and move it counterclockwise until its end is embraced by the latch; and a similar pin 127, secured to the outer rim of the arcuate track means 90 at a point above the loading station, projecting into the path of the beveled end of the latch for tripping it as the tray moves upward, and releasing the actuator arm. In the traverse of the tray between these two pins the actuator arm is held latched and the front of the cover maintained in elevated position. Figure 14 shows a fragment of the tray in its initial dumping position illustrating the relative positions of the latch and actuator arm while the latter is contacted by the pin 125.

As in the case of the first described form of the invention, it is desirable to have the actuator arm unit return gradually to its repose position when released, principally to prevent the cover from slamming down upon the pan. Therefore, a lowering cam 128 has been added to the oven structure, this being fixed to the inner rim of the arcuate track means 90, following the curvature of said rim and extending inwardly therefrom. The actuator arm is provided with a pin 129 projecting outwardly therefrom, which engages the cam 128 when the actuator arm is released, and which hubs the cam, due to the overbalancing weight of the actuator arm unit. It will be observed that the curvature of the cam 128 is upwardly convergent with respect to the circumference 130 of the sprocket 72, so that as the pin 129 moves upward on the cam, the actuator arm progressively swings in a clockwise direction, lowering the flaps 117 until when the pin passes off the upper end of the cam the actuator arm will be against the stop pin 118 and the flaps in horizontal position, as shown in the tray position e in Figure 9. At some point in the upward traverse of the pin 129 along the cam 128 the cover will have been let down gently upon the pan a.

The above detailed description of the applicability of the invention to two distinct types of bakery oven makes it reasonable to assume that it can be practically applied to nearly all bakery ovens in current use, with but minor modifications in details to fit the specific mechanical environment with which it is called upon to cooperate. The concept of the invention is to provide a Pullman cover detachably connectable to the tray or shelf so that it may be employed when needed and removed when desired for the baking of other than Pullman bread, in which there is no risk of its being inadvertently displaced when in use, which is automatically lifted at the front responsive to the tilting of the tray at the discharge station to facilitate discharge of the pan of baked loaves, which remains elevated until the pan of unbaked loaves has been inserted in the loading station, and which automatically closes on the pan and remains in closed position during the circuit of the tray throughout the oven until it again approaches the loading station.

It will be obvious to those skilled in the art that the specific details of construction and arrangement of parts as above described, are mainly by way of example and that they do not necessarily limit the scope of the invention.

What I claim is:

1. In combination, an oven tray including a pan supporting grid, a conveyor whereon said tray is mounted to travel a recurrent path within a baking oven, which path includes an unloading station and a loading station beyond said unloading station, means for maintaining said tray with the grid level, throughout its traverse along said path except at said unloading station, a removable pan cover above said grid defining with said grid a pan space therebetween, a connection on said cover detachably engaging said tray for establishing an axis of swing of said cover at the rear of said tray, said connection being constructed to allow translatory movement of said cover in an upward direction responsive to the intrusion of a pan into the rear portion of said pan space whereby the cover adjusts itself to pans of different height, legs secured to opposite sides of the cover adjacent the front thereof extending downwardly therefrom, means at the unloading station for tilting said tray downward toward the front, means cooperating with said legs at the unloading station to inhibit tilting of the cover with the tray whereby the cover swings upwardly on its axis relative to a pan in said pan space, means carried by said tray for maintaining said cover in said upwardly swung position, from the unloading station to the loading station, and means engageable with said maintaining means for moving said maintaining means to release said legs at a point beyond said loading station permitting said cover to swing to closed position upon a pan introduced at the loading station.

2. In combination, an oven tray including a pan supporting grid, a conveyor whereon said tray is mounted to travel a recurrent path within a baking oven, which path includes an unloading station and a loading station beyond said unloading station, means for maintaining said tray with the grid level, throughout its traverse along said path except at said unloading station, a removable pan cover above said grid defining with said grid a pan space therebetween, a connection on said cover detachably engaging said tray for establishing an axis of swing of said cover at the rear of said tray, said connection being constructed to allow translatory movement of said cover in an upward direction responsive to the intrusion of a pan into the rear portion of said pan space whereby the cover adjusts itself to pans of different height, legs secured to opposite sides of the cover adjacent the front thereof extending downwardly therefrom, means at the unloading station for tilting said tray downward toward the front, means cooperating with said legs at the unloading station to inhibit tilting of the cover with said tray whereby the cover swings upward on its axis relative to a pan in said pan space, said cooperating means comprising an operative unit carried by said tray and an element nonparticipating in the tilting of the tray engageable with said unit, the latter comprising a transverse oscillatably mounted shaft beneath the grid adjacent the front, with one end extending outwardly beyond the tray, an arm fixed to said extended end and means fixed to said shaft underlying the ends of said legs, said unit being weight biased toward a repose position in which said underlying means are inert with respect to said legs, said unit being engaged by said nonparticipating element responsive to the tilting of said tray to oscillate said unit in a direction to cause said underlying means to lift said legs and thereby swing the cover upward relative to a pan in said pan space, latch means carried by said tray, latchably engageable with said arm when said unit is thus oscillated for holding said unit in cover-lifted position while said tray travels from said unloading to said loading station, and fixed means adjacent said loading station in the path of said latch means as the tray moves beyond said loading station, for moving said latch means to release said arm, permitting return of said unit to repose position and with consequent lowering of said cover upon a pan introduced at said loading station.

3. The combination as claimed in claim 2, including a fixed cam face adjacent said loading station extending upwardly convergent toward the path of travel of said tray, on which said arm rides when released, whereby said unit is gradually returned to its repose position.

4. In combination, an oven tray including upstanding opposite sides bridged by a pan supporting grid, a conveyor whereon said tray is mounted to travel a recurrent path within a baking oven, which path includes an unloading station and a loading station beyond said unloading station, means traveling with the tray for maintaining said tray with the grid level, throughout its traverse along said path except at said unloading station, a removable pan cover above said grid defining with said grid a pan space therebetween, a connection on said cover detachably engaging said tray for establishing an axis of swing of said cover at the rear of said tray, said connection being constructed to allow translatory movement of said cover in an upward direction responsive to the intrusion of a pan into the rear portion of said pan space whereby the cover adjusts itself to pans of different height, legs secured to opposite sides of the cover adjacent the front thereof extending downwardly therefrom, means at the unlodaing station for tilting said tray downward toward the front, means cooperating with said legs at the loading station to inhibit tilting of the cover with said tray whereby the cover swings upward on its axis relative to a pan in said pan space, said cooperating means comprising an operative unit carried by said tray and an element fixed to said maintaining means engageable with said unit, the latter comprising a transverse oscillatably mounted shaft beneath the grid adjacent the front, with one end extending outwardly beyond one side of the tray, an arm fixed to said extended end adjacent said side and upwardly directed, and means fixed to said shaft underlying the ends of said legs, said unit being weight biased toward a repose position in which said underlying means are inert with respect to said legs, said unit being engaged by said element responsive to the tilting of said tray to oscillate said unit in a direction to cause said underlying means to lift said legs and thereby swing the cover upward relative to a pan in said pan space, latch means pivotally mounted on the side of said tray above said arm, normally biased to contact said arm, and to latchably engage said arm when said unit is thus oscillated for holding said unit in cover-lifted position while said tray travels from said unloading to said loading station, fixed cam means adjacent said loading station in the path of said latch means as the tray moves beyond said loading station for moving said latch means to release said arm permitting return of said unit to repose position with consequent lowering of said cover upon a pan introduced at said loading station, and a fixed cam face adjacent said loading station extending upwardly convergent toward the path of travel of said tray, on which said arm rides upon its release, whereby said unit is gradually returned to its repose position.

5. In combination, an oven tray including upstanding opposite sides bridged by a pan supporting grid, a conveyor whereon said tray is mounted to travel a recurrent path within a baking oven, which path includes an unloading station and a loading station beyond said unloading station, means for maintaining said tray with the grid level, throughout its traverse along said path except at said unloading station, a removable pan cover above the grid defining with said grid a pan space therebetween, a connection on said cover detachably engaging said tray for establishing an axis of swing of said cover at the rear of said tray, said connection being constructed to allow translatory movement of said cover in an upward direction responsive to the intrusion of a pan into the rear portion of said pan space whereby the cover adjusts itself to pans of different height, legs secured to opposite sides of the cover adjacent the front thereof extending downwardly therefrom, means at the unloading station for tilting said tray downward toward the front, means cooperating with said legs at the unloading station to inhibit tilting of the cover with said tray whereby the cover swings upward on its axis relative to a pan in said pan space, said cooperating means comprising an operative unit carried by said tray and an element fixed to oven structure adjacent said unloading station engageable with said unit, the latter comprising a transverse oscillatably mounted shaft beneath the grid adjacent the front with one end extending outwardly beyond one side of the tray, an arm fixed to said extended end adjacent said side, upwardly directed, and means fixed to said shaft underlying the ends of said legs, said unit being weight biased toward a repose position in which said underlying means are inert with respect to said legs, said fixed element being in the path of movement of said arm in the initial tilting movement of said tray, engaging said arm to oscillate said unit in a direction to cause said underlying means to lift said legs and thereby swing the cover upward relative to a pan in said pan space, latch means pivotally mounted on the side of said tray above said arm, normally biased to contact said arm, and to latchably engage said arm when said unit is thus oscillated for holding said unit in cover-lifted position while said tray travels from said unloading to said loading station, fixed cam means adjacent said loading station in the path of said latch means as the tray moves beyond said loading station for moving said latch means to release said arm permitting return of said unit to repose position with consequent lowering of said cover upon a pan introduced at said loading station, and a fixed cam face adjacent said loading station extending upwardly convergent toward the path of travel of said tray, on which said arm rides upon its release, whereby said unit is gradually returned to its repose position.

6. In combination, an oven tray including a pan supporting grid a conveyor whereon said tray is mounted to travel a recurrent path within a baking oven, which path includes an unloading station and a loading station beyond said unloading station, means for maintaining said tray with the grid level, throughout its traverse along said path except at said unloading station, a removable pan cover above said grid defining with said grid a pan space therebetween, a connection on said cover detachably engaging said tray for establishing an axis of swing of said cover at the rear of said tray, said connection being constructed to allow translatory movement of said cover in an upward direction responsive to the intrusion of a pan into the rear portion of said pan space whereby the cover adjusts itself to pans of different height, legs secured to opposite sides of the cover adjacent the front thereof extending downwardly therefrom, means at the unloading station for tilting said tray downward toward the front, means cooperating with said legs at the unloading station to inhibit tilting of the cover with the tray whereby the cover swings upwardly on its axis relative to a pan in said pan space, to clear said pan, facilitating the discharge of said pan.

7. In a baking oven having a conveyor upon which pan trays are mounted which tilt downwardly adjacent an unloading station of the conveyor to discharge gravitationally pans carried by said trays, a Pullman cover for a bread pan supported on one of said trays comprising a rectangular substantially planiform plate having legs secured thereto at opposite sides extending downwardly therefrom, hook means rearwardly of said legs secured to said plate adapted to detachably engage complementary means on the tray whereby the cover is hingedly mounted, stops carried by said conveyor beneath said tray at a fixed distance radially from the axis whereon said tray tilts, said legs being engageable by said stops, responsive to downward tilt of said tray to inhibit corresponding tilt of the cover whereby the latter is lifted at the front relative to said pan.

8. In a baking oven having a conveyor upon which pan trays are mounted which tilt downwardly adjacent an unloading station of said conveyor to discharge gravitationally pans carried by said trays, a Pullman cover for a conventional compartmented bread pan in which the loaf compartments are spaced from one another forming flues therebetween, said cover being supported by one of said trays and comprising a rectangular substantially planiform plate having legs secured thereto at opposite sides extending downwardly therefrom, hook means rearwardly of said legs secured to said plate, adapted to detachably engage complementary means on the tray whereby the cover is hingedly mounted, stops carried by said conveyor beneath said tray at a fixed distance radially from the axis whereon said tray tilts, said legs being engageable by said stops, responsive to downward tilt of said tray to inhibit corresponding tilt of the cover whereby the latter is lifted at the front relative to said pan, said planiform member being formed with a uniform pattern of closely distributed perforations extending over the areas of said member that overlie the flues as well as the areas that overlie the loaf compartments.

9. A Pullman cover for a bread pan carried by a travelling normally level oven tray which tilts at an unloading station to gravitationally discharge the pan, said cover comprising a rectangular planiform pan covering member, a peripheral reinforcement therefor, legs extending downward from said member at opposite sides secured to said reinforcement, hook means rearwardly of said legs secured to said member adapted to detachably engage complementary means on the oven tray whereby the cover is swingably mounted, said legs being adapted to engage relatively stationary means associated with the tray when the tray tilts downwardly, to inhibit corresponding downward tilt of the cover whereby the latter is lifted at the front relative to the pan, said hook means being constructed to provide lost motion between itself and said complementary means in the direction of the height of the pan, whereby said cover is self-adjusting to close down upon pans of different height.

10. A Pullman cover for a bread pan carried by a travelling normally level oven tray which tilts at an unloading station to gravitationally discharge the pan, said cover comprising a rectangular planiform pan covering member, a peripheral reinforcement therefor, legs extending downward from said member at opposite sides secured to said reinforcement, hook means rearwardly of said legs secured to said member adapted to detachably engage complementary means on the oven tray whereby the cover is swingably mounted, said legs being adapted to engage relatively stationary means associated with the tray when the tray tilts downwardly, to inhibit corresponding downward tilt of the cover whereby the latter is lifted at the front relative to the pan, said legs being secured to the outside of said reinforcement, one leg being displaced rearwardly of the other by a distance equal at least to the width of a leg, whereby when two similar covers are in side to side abutment adjacent legs will be nested one behind the other.

11. A Pullman cover for a bread pan carried by a travelling normally level oven tray which tilts at an unloading station to gravitationally discharge the pan, said cover comprising a rectangular planiform pan covering member, a peripheral reinforcement therefor, legs extending downward from said member at opposite sides secured to said reinforcement, hook means rearwardly of said legs secured to said member adapted to detachably engage complementary means on the oven tray whereby the cover is swingably mounted, said legs being adapted to engage relatively stationary means associated with the tray when the tray tilts downwardly, to inhibit corresponding downward tilt of the cover whereby the latter is lifted at the front relative to the pan, a downwardly extending flange at the rear of said planiform member rigid therewith and substantially perpendicular thereto, adapted to nudge the pan when the cover is tilted relatively thereto to start it on its gravitational slide at the unloading station.

12. A Pullman cover for a bread pan carried by a travelling normally level oven tray which tilts at an unloading station to gravitationally discharge the pan, said cover comprising a rectangular planiform pan covering member, a peripheral reinforcement therefor, legs extending downward from said member at opposite sides secured to said reinforcement, hook means rearwardly of said legs secured to said member adapted to detachably engage complementary means on the oven tray whereby the cover is swingably mounted, said legs being adapted to engage relatively stationary means associated with the tray when the tray tilts downwardly, to inhibit corresponding downward tilt of the cover whereby the latter is lifted at the front relative to the pan, a downwardly extending flange at the rear end of said planiform member rigid therewith and substantially perpendicular thereto, adapted to nudge the pan when the cover is tilted relatively thereto to start it on its gravitational slide at the unloading station, said hook means being secured to said flange.

13. A Pullman cover for a bread pan carried by a travelling normally level oven tray which tilts at an unloading station to gravitationally discharge the pan, said cover comprising a rectangular planiform pan covering member, a peripheral reinforcement therefor, legs extending downward from said member at opposite sides secured to said reinforcement, hook means rearwardly of said legs secured to said member adapted to detachably engage complementary means on the oven tray whereby the cover is swingably mounted, said legs being adapted to engage relatively stationary means associated with the tray when the tray tilts downwardly, to inhibit corresponding downward tilt of the cover whereby the latter is lifted at the front relative to the pan, flanges extending downwardly in a common plane at the rear of said planiform member adjacent the ends, substantially perpendicular thereto, adapted to nudge the pan when the cover is lifted relatively thereto, to start it on its gravitational slide at the unloading station, said hook means being divided into similar parts, one secured to each flange.

14. A Pullman cover for a bread pan carried by a travelling normally level oven tray which tilts at an unloading station to gravitationally discharge the pan, said cover comprising a rectangular planiform pan covering member, a peripheral reinforcement therefor, legs extending downward from said member at opposite sides secured to said reinforcement, hook means rearwardly of said legs secured to said member adapted to detachably engage complementary means on the oven tray whereby the cover is swingably mounted, said legs being adapted to engage relatively stationary means associated with the tray when the tray tilts downwardly, to inhibit corresponding downward tilt of the cover whereby the latter is lifted at the front relative to the pan, said reinforcement comprising a frame of flanges upstanding from said planiform member, and further reinforcement for the latter comprising intersecting diagonal flanges secured in the corners of said frame and to the upper face of said planiform member.

References Cited in the file of this patent

UNITED STATES PATENTS

| | | |
|---|---|---|
| 139,802 | McKenzie | June 10, 1873 |
| 1,064,194 | Carroll | June 10, 1913 |
| 1,130,568 | Callow | Mar. 2, 1915 |
| 2,539,423 | Howard | Jan. 30, 1951 |